(12) United States Patent
Sone (10) Patent No.: US 11,462,862 B2
(45) Date of Patent: Oct. 4, 2022

(54) CONNECTOR, AND DEVICE WITH CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kosuke Sone, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/041,083

(22) PCT Filed: Mar. 12, 2019

(86) PCT No.: PCT/JP2019/009868
§ 371 (c)(1),
(2) Date: Sep. 24, 2020

(87) PCT Pub. No.: WO2019/188232
PCT Pub. Date: Oct. 3, 2019

(65) Prior Publication Data
US 2021/0098941 A1    Apr. 1, 2021

(30) Foreign Application Priority Data
Mar. 30, 2018 (JP) .............................. JP2018-066980

(51) Int. Cl.
*H01R 13/6581* (2011.01)
*H01R 13/518* (2006.01)
(Continued)

(52) U.S. Cl.
CPC ....... *H01R 13/6581* (2013.01); *H01R 13/518* (2013.01); *H01R 13/639* (2013.01);
(Continued)

(58) Field of Classification Search
CPC .............. H01R 13/6581; H01R 13/518; H01R 13/639; H01R 13/64; H01R 2103/00; H01R 13/6272; H01R 24/66; F16H 61/0006
See application file for complete search history.

(56) References Cited

U.S. PATENT DOCUMENTS 9,905,970 B2    2/2018 Sone et al.
2001/0024900 A1    9/2001 Miwa
(Continued)

OTHER PUBLICATIONS

International Search Report dated May 7, 2019 for WO 2019/188232 A1 (4 pages).

*Primary Examiner* — Abdullah A Riyami
*Assistant Examiner* — Justin M Kratt
(74) *Attorney, Agent, or Firm* — Venjuris, P.C.

(57) ABSTRACT

A connector 16 to be disposed on an outer peripheral surface of a valve body 11 having a cylindrical shape is provided with a leg portion 17 projecting radially outward of the valve body 11, a receptacle 18 formed along the outer peripheral surface of the valve body 11 from a tip part of the leg portion 17 and fittable to a mating connector, a plurality of terminals 21A, 21B embedded in the leg portion 17 and disposed along the outer peripheral surface of the valve body 11 in the receptacle 18, and a locking portion 24 disposed between the plurality of terminals 21A, 21B and configured to lock the mating connector.

5 Claims, 4 Drawing Sheets

(51) Int. Cl.
*H01R 13/639* (2006.01)
*H01R 13/64* (2006.01)
*H01R 13/627* (2006.01)
*F16H 61/00* (2006.01)
*H01R 103/00* (2006.01)
*H01R 24/66* (2011.01)

(52) U.S. Cl.
CPC ......... *H01R 13/64* (2013.01); *F16H 61/0006* (2013.01); *H01R 13/6272* (2013.01); *H01R 24/66* (2013.01); *H01R 2103/00* (2013.01)

(56) References Cited

U.S. PATENT DOCUMENTS

2016/0197438 A1    7/2016  Kitamura et al.
2016/0344137 A1*  11/2016  Sone .................. H01R 13/6315

\* cited by examiner

CONNECTOR, AND DEVICE WITH CONNECTOR

CROSS REFERENCE TO RELATED APPLICATIONS

This application is a national phase of PCT application No. PCT/JP2019/009868, filed on 12 Mar. 2019, which claims priority from Japanese patent application No. 2018-066980, filed on 30 Mar. 2018, all of which are incorporated herein by reference.

TECHNICAL FIELD

The present invention relates to a connector to be mounted on a device having a cylindrical shape and a device with connector including this connector.

BACKGROUND

Conventionally, a device connector used by being mounted on a device disposed in an automatic transmission of a vehicle is described, for example, in patent literature 1.

In this technique, a connector housing projects on the outer peripheral surface of a tubular device. The connector housing includes a receptacle, and a terminal electrically connected to the device is disposed to project into the receptacle. The above device is, for example, a solenoid having a coil disposed inside.

The device connector is provided with a lock hole penetrating through an upper wall of the device connector at a position above the terminal and configured to lock a mating connector. A locking portion of the mating connector is resiliently fit into this lock hole, whereby the mating connector and the device connector are held in a connected state.

PRIOR ART DOCUMENT

Patent Document

Patent Document 1: JP 2016-81727A

SUMMARY OF THE INVENTION

Problems to be Solved

However, since the lock hole is disposed above the terminal in this technique, there has been a problem that the device connector is enlarged upward.

The technique disclosed in this specification was completed on the basis of the above situation and aims to provide a technique related to height reduction of a connector.

Means to Solve the Problem

The technique disclosed in this specification is directed to a connector to be disposed on an outer peripheral surface of a device having a cylindrical shape, the connector including a leg portion projecting radially outward of the device, a receptacle formed along the outer peripheral surface of the device from a tip part of the leg portion and fittable to a mating connector, a plurality of terminals embedded in the leg portion and disposed along the outer peripheral surface of the device in the receptacle, and a locking portion disposed between the plurality of terminals and configured to lock the mating connector.

According to the above configuration, since the locking portion is disposed between the plurality of terminals, a height of the connector can be reduced as compared to the case where the locking portion is disposed above the plurality of terminals.

The following modes are preferable as embodiments of the technique disclosed in this specification.

The leg portion is provided at a center position of the receptacle in a direction along the outer peripheral surface of the device.

According to the above configuration, a force received from the mating connector by the receptacle can be received equally in the direction along the outer peripheral surface of the device by the leg portion when the mating connector is fit into the receptacle. In this way, the application of a force in a direction to twist the receptacle about the leg portion can be suppressed when the mating connector is fit.

The locking portion is provided at a center position of the receptacle in the direction along the outer peripheral surface of the device.

According to the above configuration, the height of the connector can be further reduced since a space between the plurality of terminals can be effectively utilized.

Further, the technique disclosed in this specification is directed to a device with connector including a device having a cylindrical shape extending along an axial direction, a connector to be disposed on an outer peripheral surface of the device, and a magnetic shield member made of metal, to be mounted outside the device and having a tubular shape open on one end part, the magnetic shield member including an avoidance recess formed into a concave shape from an opening end of the one end part to avoid interference with the leg portion.

According to the above configuration, a clearance is provided between the device and the receptacle by the leg portion projecting from the side wall of the device, and the magnetic shield member is inserted into this clearance. A part of the device not covered by the magnetic shield member is a region where the magnetic shield member is provided with the avoidance recess. In this way, the part of the device not covered by the magnetic shield member can be made smaller, wherefore the magnetic field efficiency of the device can be improved.

The device includes a front wall located on a front side and a rear wall located on a rear side with respect to the axial direction, the magnetic shield member includes a front shield portion extending along the front wall of the device and a side shield portion extending along a side wall of the device, and an end part of the side shield portion is formed into a bent portion bent along the rear wall and connected to the side shield portion.

According to the above configuration, the rear wall of the device is at least partially covered by the bent portion. In this way, the front shield portion, the side shield portion and the bent portion of the magnetic shield member are magnetically connected, wherefore the magnetic field efficiency of the device can be further improved.

Effect of the Invention

According to the technique disclosed in this specification, it is possible to reduce a height of a connector.

DETAILED DESCRIPTION TO EXECUTE THE INVENTION

Embodiment

One embodiment in which the technique disclosed in this specification is applied to a solenoid 10 (an example of a device with connector) disposed inside an automatic transmission (not shown) installed in a vehicle (not shown) is described with reference to FIGS. 1 to 4. In the following description, a Z direction is referred to as an upward direction, a Y direction is referred to as a forward direction and an X direction is referred to as a leftward direction.

(Valve Body 11)

Figure 3:
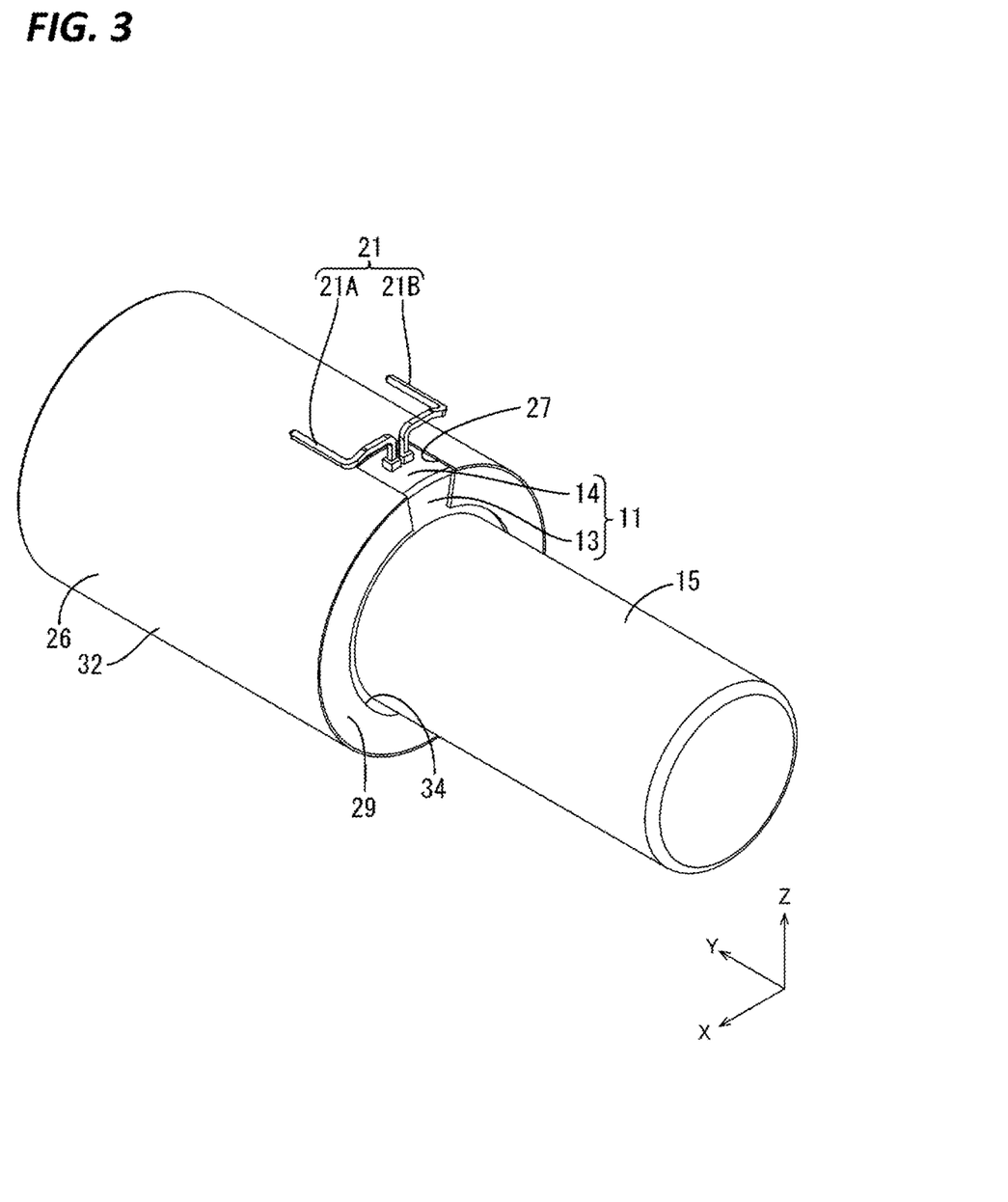
FIG. 3 is a perspective view showing the device with connector with the connector omitted.
Figure 4:
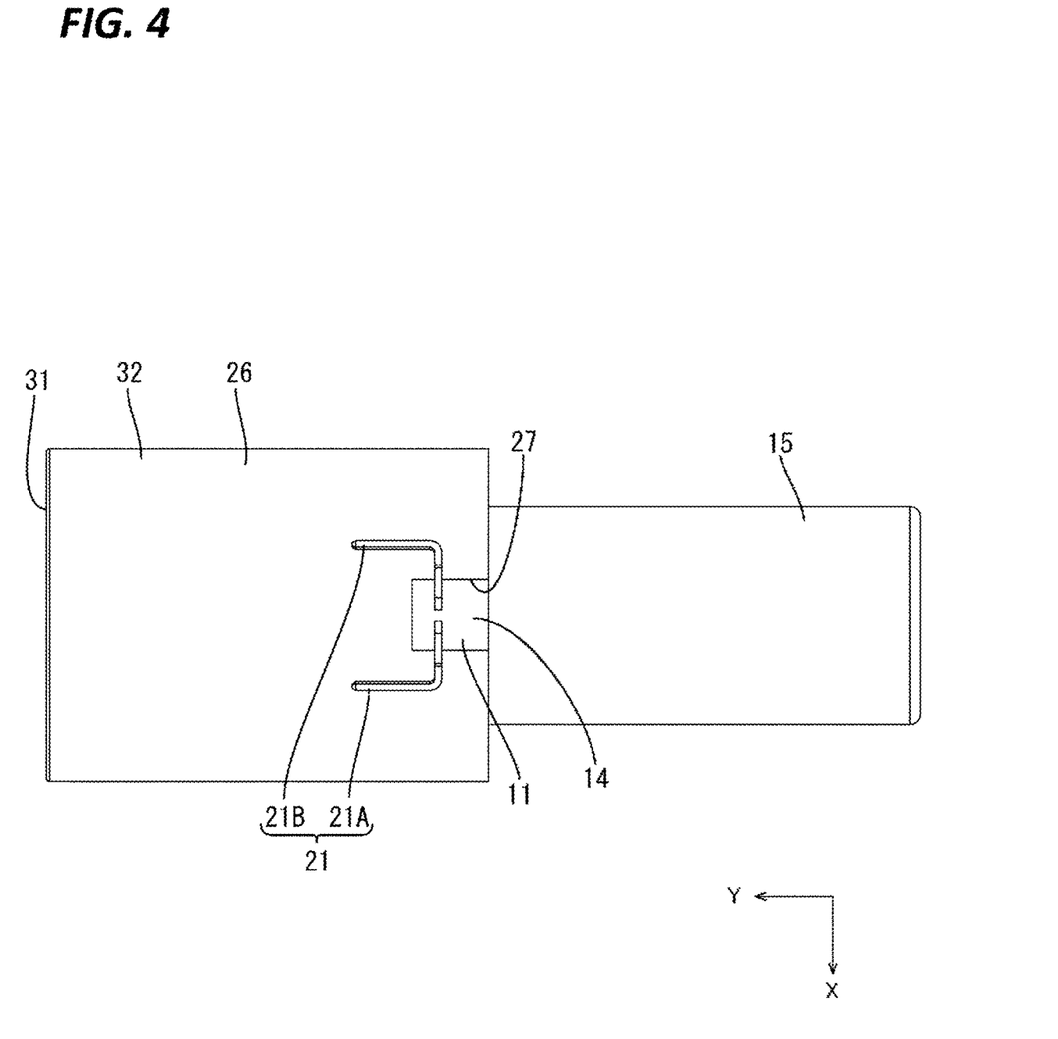
FIG. 4 is a plan view showing the device with connector with the connector omitted.

As shown in FIGS. 3 and 4, a valve body 11 (an example of a device) has a cylindrical shape extending in a front-rear direction (an example of an axial direction). A front wall is provided on a front end part of the valve body 11, and a rear wall 13 is provided on a rear end part of the valve body 11. A side wall 14 of the valve body 11 is orthogonal to the front wall and the rear wall 13.

An unillustrated coil is accommodated inside the valve body 11. A valve portion 15 projecting rearward is provided on the rear wall 13 of the valve body 11. The valve portion 15 has a cylindrical shape having a smaller diameter than the valve body 11.

(Device Connector 16)

Figure 1:
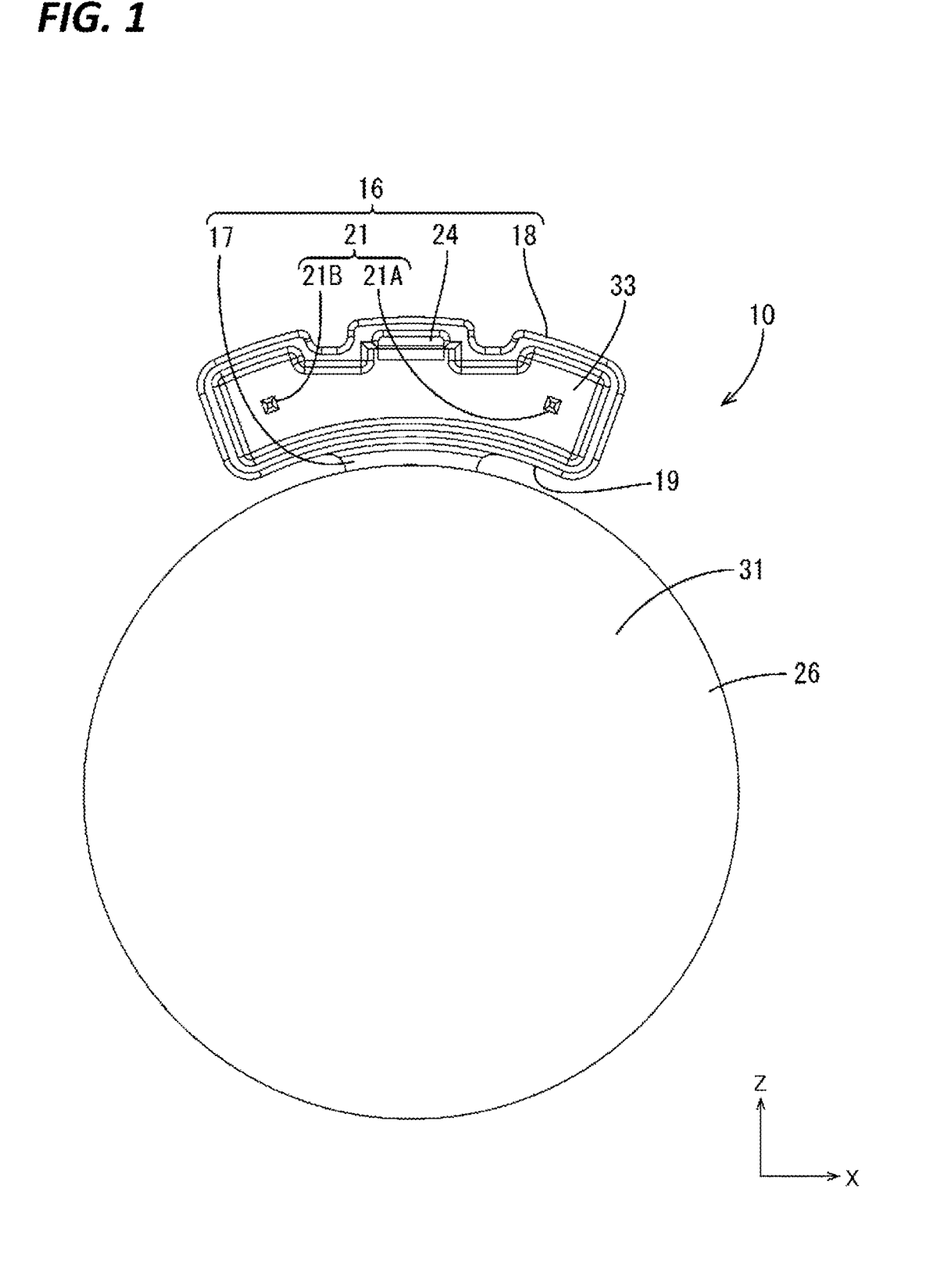
FIG. 1 is a front view showing a device with connector according to one embodiment.

As shown in FIG. 1, a connector 16 is provided to project upward from a position near a rear end part on the side wall 14 of the valve body 11. The connector 16 includes a leg portion 17 projecting radially outward of the valve body 11 from the side wall 14 of the valve body 11. A receptacle 18 is integrally formed to the leg portion 17 on an end part of the leg portion 17 opposite to the valve body 11. The receptacle 18 is open forward and an unillustrated mating connector is fittable thereinto from front. The leg portion 17 and the receptacle 18 are formed by injection molding of insulating synthetic resin. A clearance 19 is formed between the side wall 14 of the valve body 11 and the receptacle 18 by the leg portion 17.

The leg portion 17 is provided at a center position of the receptacle 18 in a direction along the outer peripheral surface of the valve body 11 when viewed from front. The center position of the receptacle 18 in the direction along the outer peripheral surface of the valve body 11 may be a perfect center position or may be such a region substantially regarded as the center position even without being the center position.

A plurality of (two in this embodiment) terminals 21 are disposed inside the receptacle 18. Parts of the terminals 21 disposed in the receptacle 18 are formed into a tab shape extending forward. The terminal 21 is made of conductive metal and bar-like. An arbitrary metal such as copper or copper alloy can be appropriately selected according to need as the metal constituting the terminal 21. A plating layer made of metal such as tin or nickel may be formed on the surface of the terminal 21.

A rear end part of the terminal 21 is embedded in a rear wall 33 of the receptacle 18. Although not shown in detail, the rear end parts of the terminals 21 are bent in directions toward each other in the rear wall 33 of the receptacle 18, embedded inside the leg portion 17 while being bent radially inward of the valve body 11, and electrically connected to the coil in the valve body 11.

Figure 2:
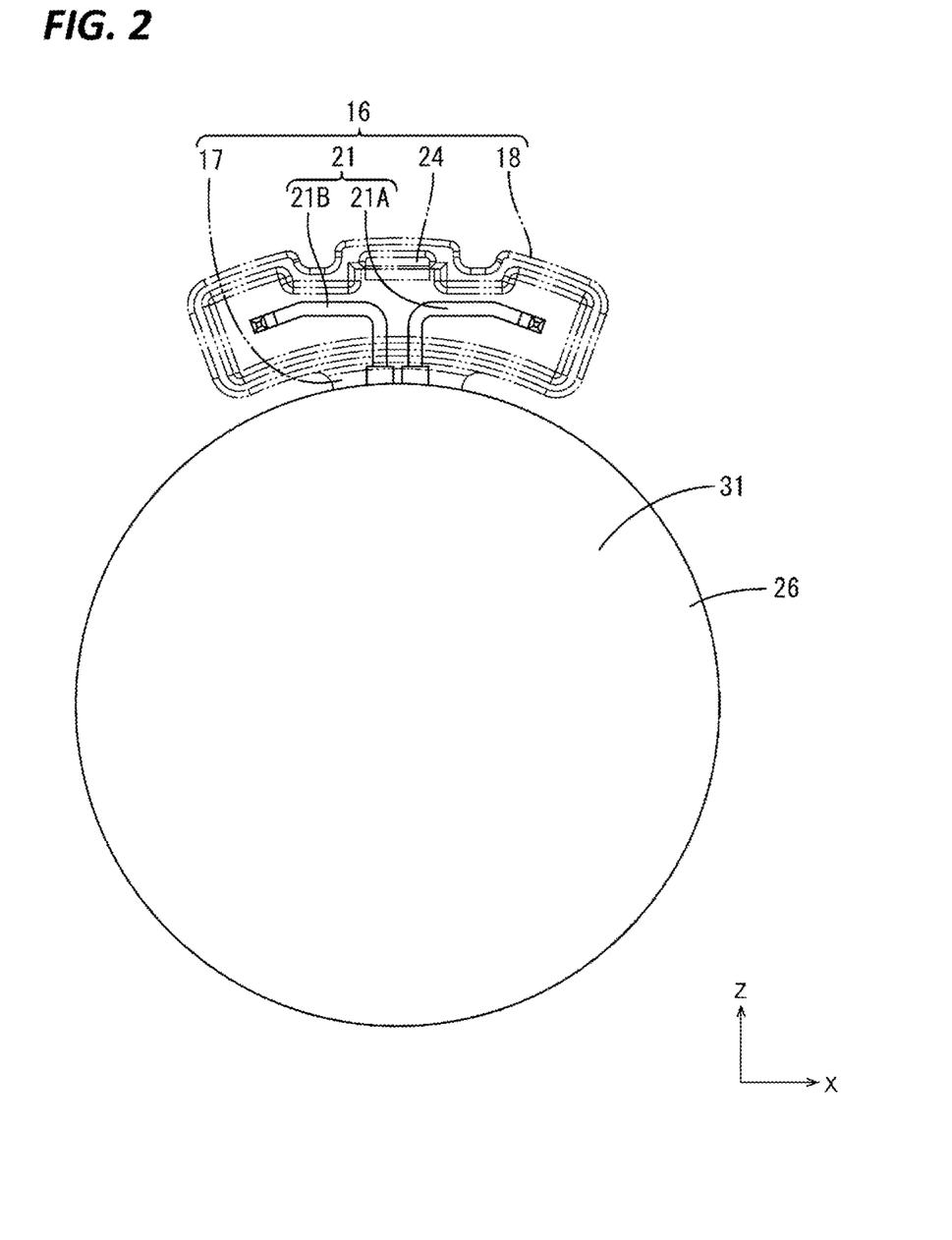
FIG. 2 is a front view showing the device with connector with a connector shown by dashed-dotted lines.

As shown in FIG. 2, the terminals 21 include a first terminal 21A located on a left side and a second terminal 21B located on a right side. Note that, in the following description, the first and second terminals 21A, 21B may be merely written as the terminals 21 when being described without being distinguished. The first terminal 21A projects radially outward of the valve body 11 from the side wall 14 of the valve body 11, bent in a clockwise direction when viewed from front, and then bent forward. On the other hand, the second terminal 21B projects radially outward of the valve body 11 from the side wall 14 of the valve body 11, bent in a counterclockwise direction when viewed from front, and then bent forward. The first and second terminals 21A, 21B are bent in directions away from each other along a circumferential direction of the valve body 11 after projecting from the side wall 14 of the valve body 11.

As shown in FIG. 1, a locking portion 24 is formed at a position between the first and second terminals 21A, 21B on the upper wall of the receptacle 18. This locking portion 24 and a lock receiving portion formed on the mating connector are resiliently locked, whereby the mating connector fit into the receptacle 18 is retained and held. With the mating connector fit in the receptacle 18, the tab-like terminals 21 of the connector 16 and female terminals (not shown) of the mating connector are electrically connected.

In the connector 16, the locking portion 24, a front end part of the first terminal 21A and a front end part of the second terminal 21B are disposed side by side along the outer peripheral surface of the side wall 14 of the valve body 11 while being spaced apart along the circumferential direction of the valve body 11.

The locking portion 24 is provided at a center position of the receptacle 18 in the direction along the outer peripheral surface of the valve body 11 when viewed from front. The center position of the receptacle 18 in the direction along the outer peripheral surface of the valve body 11 may be a perfect center position or may be such a region substantially regarded as the center position even without being the center position.

(Magnetic Shield Member 26)

As shown in FIG. 3, a magnetic shield member 26 made of metal is mounted outside the valve body 11 from front. An arbitrary metal such as copper, copper alloy, iron or iron alloy can be appropriately selected according to need as the metal constituting the magnetic shield member 26.

The magnetic shield member 26 is formed into a cylindrical shape extending in the front-rear direction and having a closed front side and an open rear side. An inner diameter of the magnetic shield member 26 is set substantially equal to an outer diameter of the valve body 11. An avoidance recess 27 concave forward is provided in an opening end 34 of the magnetic shield member 26. The avoidance recess 27 is provided at a position corresponding to the leg portion 17 of the connector 16 with the magnetic shield member 26 externally fit on the valve body 11. A lateral width of the avoidance recess 27 is set equal to or somewhat larger than that of the leg portion 17. In this way, the leg portion 17 of the connector 16 and the magnetic shield member 26 do not interfere with each other with the magnetic shield member 26 externally fit on the valve body 11. A later-described side shield portion 32 of the magnetic shield member 26 is disposed in the clearance 19 between the receptacle 18 and the valve body 11. A region of the side shield portion 32 of the magnetic shield member 26 near the opening end 34 is bent radially inward of the valve body 11, thereby being formed into a bent portion 29 extending along the rear wall 13 of the valve body 11. The lower end edge of the bent portion 29 is set at such a position as not to interfere with the valve portion 15.

The magnetic shield member 26 includes a front shield portion 31 located forward of the front wall of the valve body 11 and the side shield portion 32 covering the side wall 14 of the valve body 11 from a radially outer side of the valve body 11 with the magnetic shield member 26 external fit on the valve body 11. The bent portion 29 is bent along the rear wall 13 of the valve body 11 and connected to the side shield portion 32.

The entire region of the front wall of the valve body 11 is covered by the front shield portion 31. As shown in FIG. 4, the side wall 14 of the valve body 11 is covered by the side shield portion 32 except in a region corresponding to the avoidance recess 27 of the magnetic shield member 26. The side wall 14 of the valve body 11 is exposed to outside in a region of the magnetic shield member 26 where the avoidance recess 27 is provided. As shown in FIG. 3, the rear wall 13 of the valve body 11 is partially covered by the bent portion 29 of the magnetic shield member 26.

By the above configuration, a front part of the valve body 11 is magnetically shielded by the front shield portion 31, a side part of the valve body 11 is magnetically shielded by the side shield portion 32 except in the region corresponding to the avoidance recess 27, and a rear part of the valve body 11 is magnetically shielded in a region corresponding to the bent portion 29.

(Manufacturing Process of Embodiment)

Next, an example of a manufacturing process of the solenoid 10 according to this embodiment is described. Note that the manufacturing process of the solenoid 10 is not limited to that described below.

The first and second terminals 21A, 21B are formed into a predetermined shape by pressing metal bars. After the terminals 21 are connected to the coil, the connector 16 is integrally formed to the valve body 11 by insert molding of insulating synthetic resin. A metal plate material is pressed into a predetermined shape, thereby forming the magnetic shield member 26.

The magnetic shield member 26 is externally fit on the valve body 11 from front. At this time, the leg portion 17 is disposed inside the avoidance recess 27 of the magnetic shield member 26.

Subsequently, the rear end edge of the magnetic shield member 26 is bent radially inward of the valve body 11, thereby forming the bent portion 29. In this way, the solenoid 10 is completed.

Thereafter, the solenoid 10 and the mating connector are electrically connected by fitting the mating connector into the receptacle 18.

(Functions and Effects of Embodiment)

Next, functions and effects of this embodiment are described. This embodiment relates to the connector 16 to be disposed on the outer peripheral surface of the cylindrical valve body 11, and the connector 16 includes the leg portion 17 projecting radially outward of the valve body 11, the receptacle 18 formed along the outer peripheral surface of the valve body 11 from a tip part of the leg portion 17 and fittable to the mating connector, the plurality of terminals 21A, 21B embedded in the leg portion 17 and disposed along the outer peripheral surface of the valve body 11 in the receptacle 18, and the locking portion 24 disposed between the plurality of terminals 21A and 21B and configured to lock the mating connector.

According to the above configuration, since the locking portion 24 is disposed between the first and second terminals 21A, 21B, a height of the connector 16 can be reduced as compared to the case where the locking portion 24 is disposed above the first and second terminals 21A, 21B.

Further, according to this embodiment, the leg portion 17 is provided at the center position of the receptacle 18 in the direction along the outer peripheral surface of the valve body 11.

According to the above configuration, a force received from the mating connector by the receptacle 18 can be received equally in the direction along the outer peripheral surface of the valve body 11 by the leg portion 17 when the mating connector is fit into the receptacle 18. In this way, the application of a force in a direction to twist the receptacle 18 about the leg portion 17 can be suppressed when the mating connector is fit.

Further, according to this embodiment, the locking portion 24 is provided at the center position of the receptacle 18 in the direction along the outer peripheral surface of the valve body 11.

According to the above configuration, the height of the connector 16 can be further reduced since a space between the plurality of terminals 21A and 21B can be effectively utilized.

Further, the solenoid 10 according to this embodiment includes the valve body 11 having a cylindrical shape extending along the axial direction, the connector 16 disposed on the outer peripheral surface of the valve body 11, and the magnetic shield member 26 made of metal, to be mounted outside the valve body 11 and having a tubular shape open on one end part, and the magnetic shield member 26 includes the avoidance recess 27 having a concave shape from the opening end 34 on the one end part and configured to avoid interference with the leg portion 17.

According to the above configuration, the clearance 19 is provided between the valve body 11 and the receptacle 18 by the leg portion 17 projecting from the side wall of the valve body 11, and the magnetic shield member 26 is inserted into this clearance 19. A part of the valve body 11 not covered by the magnetic shield member 26 is a region where the magnetic shield member 26 is provided with the avoidance recess 27. In this way, the part of the valve body 11 not covered by the magnetic shield member 26 can be made smaller, wherefore the magnetic field efficiency of the valve body 11 can be improved.

Further, according to this embodiment, the valve body 11 includes the front wall located on the front side and the rear wall 13 located on the rear side with respect to the front-rear direction (axial direction), the magnetic shield member 26 includes the front shield portion 31 extending along the front wall of the valve body 11 and the side shield portion 32 extending along the side wall 14 of the valve body 11, and an end part of the side shield portion 32 is formed into the bent portion 29 bent along the rear wall 13 and connected to the side shield portion 32.

According to the above configuration, the rear wall 13 of the valve body 11 is at least partially covered by the bent portion 29. In this way, the front shield portion 31, the side shield portion 32 and the bent portion 29 of the magnetic shield member 26 are magnetically connected, wherefore the magnetic field efficiency of the valve body 11 can be further improved.

Other Embodiments

The technique disclosed in this specification is not limited to the above described and illustrated embodiment. For example, the following embodiments are also included in the technical scope of the technique disclosed in this specification.

(1) Although two terminals 21A, 21B are disposed in the connector in the above embodiment, there is no limitation to this and three or more terminals may be disposed.

(2) Although the locking portion 24 is disposed at the center position of the receptacle 18 in the direction along the outer peripheral surface of the valve body 11 in the above embodiment, there is no limitation to this and the locking portion 24 may be disposed at a left or right end part of the receptacle 18 without limitation to the center position.

(3) Although the leg portion 17 is disposed at the center position of the receptacle 18 in the direction along the outer peripheral surface of the valve body 11 in the above embodiment, there is no limitation to this and the leg portion 17 may be disposed at the left or right end part of the receptacle 18 without limitation to the center position.

(4) Although the magnetic shield member 26 is externally fit on the valve body 11 in the above embodiment, the magnetic shield member 26 may be omitted.

(5) The magnetic shield member 26 includes the bent portion 29 in the above embodiment, there is no limitation to this and the bent portion 29 may be omitted.

(6) Although the tab-like terminals 21 are disposed in the connector 16 and the female terminals are disposed in the mating connector in the above embodiment, there is no limitation to this and female terminals may be disposed in a connector and tab-like terminals may be disposed in a mating connector.

LIST OF REFERENCE NUMERALS

10: solenoid
11: valve body
13: rear wall
14: side wall
15: valve portion
16: connector
17: leg portion
18: receptacle
19: clearance
20: opening
21: terminal
21A: first terminal
21B: second terminal
24: locking portion
26: magnetic shield member
27: avoidance recess
29: bent portion
31: front shield portion
32: side shield portion
33: rear wall
34: opening end

What is claimed is:

1. A connector disposed on an outer peripheral surface of a device having a cylindrical shape, the connector comprising:
   a leg portion projecting radially outward of the device;
   a receptacle formed along the outer peripheral surface of the device from a tip part of the leg portion and fittable to a mating connector;
   a plurality of terminals embedded in the leg portion and disposed along the outer peripheral surface of the device in the receptacle; and
   a locking portion disposed between the plurality of terminals and configured to lock the mating connector,
   wherein parts of the plurality of terminals disposed in the receptacle and the locking portion are disposed side by side along the outer peripheral surface of the device while being spaced apart from each other,
   the plurality of terminals are bent in directions away from each other along a circumferential direction of the device,
   a clearance is formed between the device and the receptacle by the leg portion,
   the device includes a magnetic shield member made of metal, to be mounted on an outside of the device and having a tubular shape open on one end part, and
   the magnetic shield member is inserted into the clearance.

2. The connector of claim 1, wherein the leg portion is provided at a center position of the receptacle in a direction along the outer peripheral surface of the device.

3. The connector of claim 1, wherein the locking portion is provided at a center position of the receptacle in a direction along the outer peripheral surface of the device.

4. A device having a cylindrical shape extending along an axial direction, the device comprising:
   a connector disposed on an outer peripheral surface of the device, wherein the connector includes:
     a leg portion projecting radially outward of the device;
     a receptacle formed along the outer peripheral surface of the device from a tip part of the leg portion and fittable to a mating connector;
     a plurality of terminals embedded in the leg portion and disposed along the outer peripheral surface of the device in the receptacle; and
     a locking portion disposed between the plurality of terminals and configured to lock the mating connector,
   wherein parts of the plurality of terminals disposed in the receptacle and the locking portion are disposed side by side along the outer peripheral surface of the device while being spaced apart from each other,
   the plurality of terminals are bent in directions away from each other along a circumferential direction of the device, and
   a clearance is formed between the device and the receptacle by the leg portion, and
   a magnetic shield member made of metal, to be mounted on an outside of the device and having a tubular shape open on one end part,
   wherein the magnetic shield member includes an avoidance recess formed into a concave shape from an opening end of the one end part to avoid interference with the leg portion,
   the device includes a front wall located on a front side and a rear wall located on a rear side with respect to the axial direction,
   the magnetic shield member includes a front shield portion extending along the front wall of the device and a side shield portion extending along a side wall of the device, and
   an end part of the side shield portion is formed into a bent portion bent along the rear wall and connected to the side shield portion.

5. A device having a cylindrical shape extending along an axial direction, the device comprising:
a connector disposed on an outer peripheral surface of the device, wherein the connector includes:
a leg portion projecting radially outward of the device;
a receptacle formed along the outer peripheral surface of the device from a tip part of the leg portion and fittable to a mating connector;
a plurality of terminals embedded in the leg portion and disposed along the outer peripheral surface of the device in the receptacle; and
a locking portion disposed between the plurality of terminals and configured to lock the mating connector,
wherein parts of the plurality of terminals disposed in the receptacle and the locking portion are disposed side by side along the outer peripheral surface of the device while being spaced apart from each other,
the plurality of terminals are bent in directions away from each other along a circumferential direction of the device,
a clearance is formed between the device and the receptacle by the leg portion, and
a magnetic shield member made of metal, to be mounted on an outside of the device and having a tubular shape open on one end part,
wherein the magnetic shield member includes an avoidance recess formed into a concave shape from an opening end of the one end part to avoid interference with the leg portion, and
the magnetic shield member is inserted into the clearance.

\* \* \* \* \*